(12) United States Patent
McKenzie

(10) Patent No.: US 9,521,834 B2
(45) Date of Patent: Dec. 20, 2016

(54) DEVICE FOR RETAINING FISHING LINE ON A FISHING ROD

(76) Inventor: Martha McKenzie, Eufaula, AL (US)

( * ) Notice: Subject to any disclaimer, the term of this patent is extended or adjusted under 35 U.S.C. 154(b) by 383 days.

(21) Appl. No.: 13/357,632

(22) Filed: Jan. 25, 2012

(65) Prior Publication Data

US 2013/0185988 A1    Jul. 25, 2013

(51) Int. Cl.
*A01K 97/06* (2006.01)
(52) U.S. Cl.
CPC ....................... *A01K 97/06* (2013.01)
(58) Field of Classification Search
CPC ...................................................... A01K 97/06
USPC .............. 43/57.1, 25.2; 294/99.1, 99.2, 100;
132/273, 276, 277–279
IPC ..................................................... A01K 97/06
See application file for complete search history.

(56) References Cited

U.S. PATENT DOCUMENTS

| | | | | |
|---|---|---|---|---|
| 2,634,159 A * | 4/1953 | Agneberg | ...................... | 294/118 |
| 2,943,414 A * | 7/1960 | Tussing | ......................... | 43/25.2 |
| 6,311,699 B1 * | 11/2001 | Horman | ........................ | 132/278 |
| 6,460,231 B2 * | 10/2002 | Bourgerie | ............. | A01K 97/08 |
| | | | | 24/487 |
| 6,842,951 B1 * | 1/2005 | Barre | ....................... | B25B 7/00 |
| | | | | 24/499 |
| D580,103 S * | 11/2008 | Pichon | ........................... | D28/40 |
| 2003/0233740 A1 * | 12/2003 | Adams | ........................... | 24/501 |
| 2004/0065341 A1 * | 4/2004 | La Fauci | ...................... | 132/277 |
| 2006/0021631 A1 * | 2/2006 | Lafauci | .......................... | 132/277 |
| 2008/0116705 A1 * | 5/2008 | Rodriguez | ................... | 294/99.2 |

OTHER PUBLICATIONS

Google.com, https://www.google.com/search?q=the+find:+jaw+hair+clip+with+fish+shape&biw=1920&bih=1029&tbm=isch&imgil=WWd_I7mt811tsM%253A%253BNGf0QLLT3GivnM%253Bhttp%25253A%25252F%25252Fwww.amazon.com%25252FAmaranth-Shaped-Pratten-Plastic-Hairclip%25252Fdp%Fdp&25252FB00DN5JZQ4&source=iu&pf=m&fir=WWd_I7mt811sM%253A%252CNGf0QLLT3GivnM%252C_&usg=_V05s_29.*

* cited by examiner

*Primary Examiner* — Thien Thanh Pham
(74) *Attorney, Agent, or Firm* — Epstein Drangel LLP; Robert L. Epstein

(57) ABSTRACT

The device for retaining fishing line on a fishing rod includes first and second jaw members. Each of the jaw members has a clamping portion and a handle portion. The first and second jaw members are connected for pivotal movement between a first position, wherein the clamping portions are proximate each other, and a second position, wherein the clamping portions are remote from each other. A spring is provided for biasing the jaw members toward the first position. First and second resilient members, each having an interior planar surface and an arcuate exterior surface, are fixed to different ones of the jaw members such that when the jaw members are in the first position, the interior surfaces of the first and second resilient members face each other and can retain the fishing rod and fishing line therebetween.

9 Claims, 4 Drawing Sheets

DEVICE FOR RETAINING FISHING LINE ON A FISHING ROD

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

1. Field of the Invention

The present invention relates to fishing equipment and more particularly to a device for retaining fishing line on a fishing rod.

2. Description of Prior Art Including Information Disclosed Under 37 CFR 1.97 and 1.98

Transporting a fishing rod with a hook or lure attached to the fishing line can be dangerous to the person transporting the rod, as well as those in the vicinity, because a loose hook or lure can penetrate the flesh and is not easily removed without causing substantial injury. Accordingly, there is a need for a simple, inexpensive, easy to use and esthetically pleasing device for retaining the fishing line on the fishing rod.

It is therefore, a prime object of the present invention to provide a device for retaining fishing line on a fishing rod.

It is another object of the present invention to provide a device for retaining fishing line on a fishing rod which is formed of simple, inexpensive parts that work reliably together.

It is another object of the present invention to provide a device for retaining fishing line on a fishing rod which is easy to use.

It is another object of the present invention to provide a device for retaining fishing line on a fishing rod which is aesthetically pleasing.

It is another object of the present invention to provide a device for retaining fishing line on a fishing rod which is capable of reliably retaining the line on the rod without causing damage to the line or to the rod.

It is another object of the present invention to provide a device for retaining fishing line on a fishing rod which is can be easily mounted on and removed from the fishing rod.

It is another object of the present invention to provide a device for retaining fishing line on a fishing rod which is light in weight.

It is another object of the present invention to provide a device for retaining fishing line on a fishing rod which is formed of plastic parts which can be fabricated using conventional injection molding techniques.

BRIEF SUMMARY OF THE INVENTION

In general, the present invention accomplishes those objects by providing a clip-like device for retaining fishing line on a fishing rod. The device includes first and second jaw members. Each of the jaw members has a clamping portion and a handle portion. Means are provided for connecting the first and second jaw members for pivotal movement between a first position, wherein the clamping portions are proximate each other, and a second position, wherein the clamping portions are remote from each other. Means are provided for biasing the jaw members toward the first position. First and second resilient members are provided; each of the resilient members having an interior surface and an exterior surface. The exterior surface of each of the resilient members is fixed to a different one of the jaw members such that when the jaws members are in the first position, the interior surfaces of the first and second resilient members face each other.

The clamping portion of each of said jaw members preferably has an arcuate interior surface. Each of the resilient members has a generally semi-cylindrical shape, with a substantially planar interior surface and a substantially arcuate exterior surface. The interior surfaces of the first and second resilient members are spaced from each other when said jaw members are in said first position.

The clamping portion of one of said jaw members has a set of spaced fingers. The clamping portion of each of the jaw members includes a set of spaced fingers, the fingers of one of the sets are offset relative to the fingers of the other of the finger sets.

The handle members extend away from each other when the jaw members are in the first position.

Preferably, a section of one of the jaw members has a fish-like shape.

In accordance with another aspect of the present invention, a combination of a fishing rod having a fishing line, and a device for retaining the fishing line on the fishing rod, is provided. The device includes first and second jaw members. Each of the jaw members has a clamping portion and a handle portion. Means are provided for connecting the first and second jaw members for pivotal movement between a first position, wherein the clamping portions are proximate each other, and a second position, wherein the clamping portions are remote from each other. Means are provided for biasing said jaw members toward the first position. First and second resilient members are also provided. Each of the resilient members has an interior surface and an exterior surface. The exterior surface of each of the resilient members is fixed to a different one of the jaw members, such that when the jaw members are in the first position, the resilient members retain the fishing rod and the fishing line therebetween.

The clamping portion of each jaw member has an arcuate interior surface. Each of the resilient members has a generally semi-cylindrical shape, with a substantially planar interior surface and a substantially arcuate exterior surface. The interior surfaces of the resilient members are spaced from each other when the jaw members are in said first position.

The clamping portion of each of the jaw members includes a set of spaced fingers. The fingers of one of the sets are offset from the fingers from the other of the sets.

The handle members extend away from each other when the jaw members are in the first position.

Preferably, a section of one or both of the jaw members has a fish-like shape.

In accordance with another aspect of the present invention, a device for retaining fishing line on a fishing rod is provided. The device includes first and second jaw members. The first jaw member has a clamping portion including a first set of arcuate spaced fingers, and a handle portion. The second jaw member has a clamping portion including a second set of arcuate spaced fingers, offset from the fingers of the first set of fingers, and a handle portion. Means are provided for connecting the first and second jaw members for pivotal movement between a first position, wherein the clamping portions are proximate each other, and the fingers of one of the finger sets are situated between the fingers of the other finger set, and a second position, wherein the clamping portions are remote from each other. Means are provided for biasing the jaw members toward the first position. First and second semi-cylindrical resilient members are provided. Each of the resilient members includes a substantially planar interior surface and a substantially arcuate exterior surface. The exterior surface of each of the resilient members is fixed to a different one of the jaw members such that when the jaw members are in the first position, the substantially planar interior surfaces of the first and second resilient members face each other.

BRIEF DESCRIPTION OF THE SEVERAL VIEWS OF DRAWINGS

To these and to such other objects that may hereinafter appear, the present invention relates to a device for retaining fishing line on a fishing rod as described in detail in the following specification and recited in the annexed claims, taken together with the accompanying drawings, in which like numerals refer to like parts and in which:

DETAILED DESCRIPTION OF THE INVENTION

Figure 1:
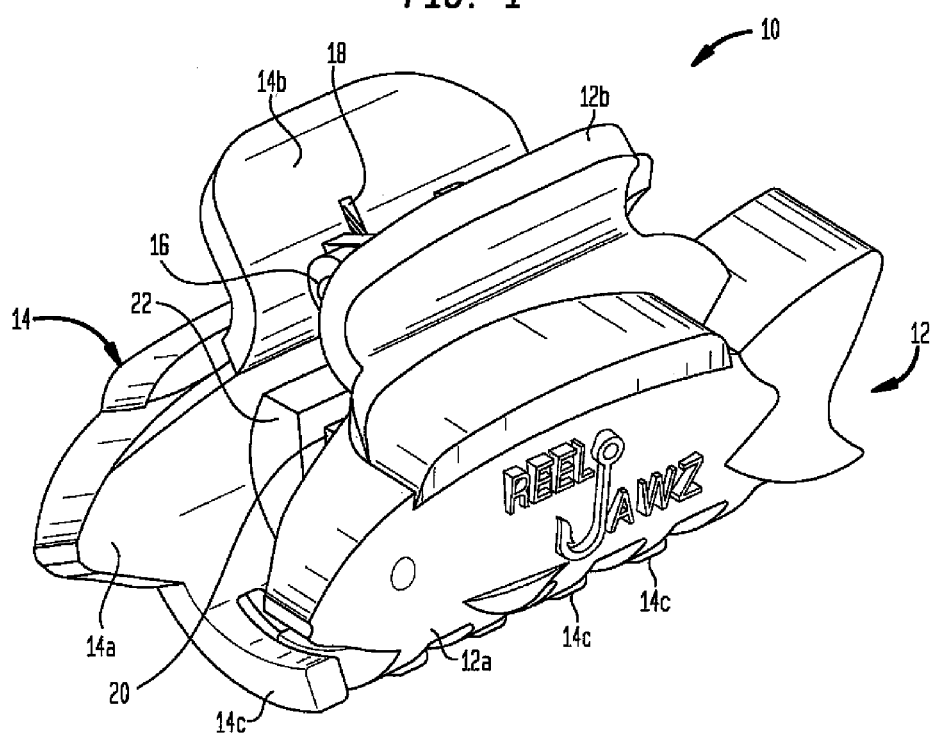
FIG. 1 is a perspective view of the device of the present invention, wherein the device is shown with the jaw members in the proximate or closed position.

As seen in the drawings, the present invention is a clip-like device, generally designated 10, for retaining fishing line on a fishing rod. Device 10 is formed of a first jaw member 12 and a second jaw member 14.

Each of the jaw members 12, 14 includes a clamping portion 12a, 14a and a handle portion 12b, 14b. Each of the clamping portions 12a, 14a includes a set of spaced, arcuate fingers 12c, 14c.

Figure 5:
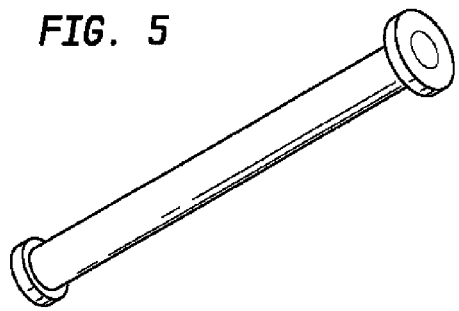
FIG. 5 is a perspective view of the pivot member of the device of FIG. 1.

Jaw members 12, 14 are connected by an elongated pivot member 16, illustrated in FIG. 5, which allows the jaw members to pivot between a position wherein the clamping portions are proximate each other, as seen in the drawings, and a second position wherein the clamping portions are remote from each other.

Figure 4:
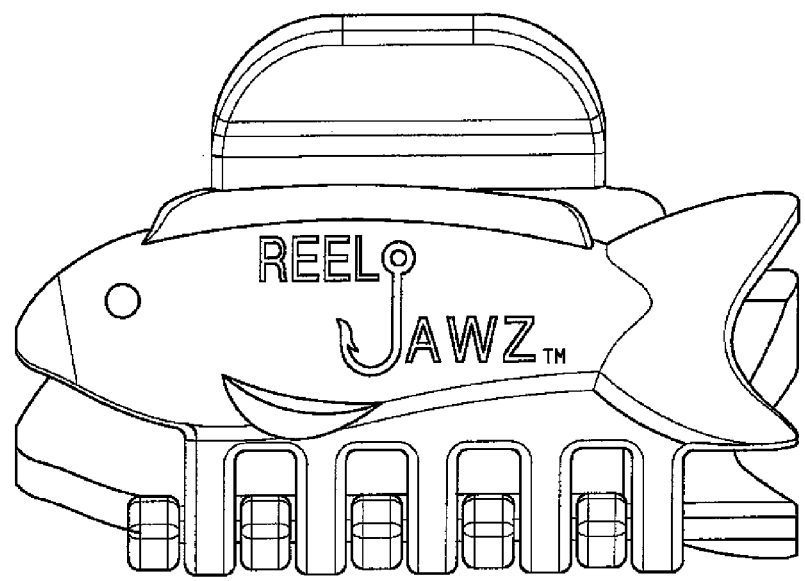
FIG. 4 is a plan view of the side of the device of FIG. 1.

As best seen in FIG. 4, the fingers in each set of fingers 12c, 14c are spaced from each other and the fingers of one set are offset relative to the fingers of the other set such that when the jaw members are in the proximate position, the fingers mesh or interleave with each other. In the remote position of the jaw members, the finger sets are separate from each other so as to permit the fishing rod to be received between the clamping portions or removed therefrom.

Figure 2:
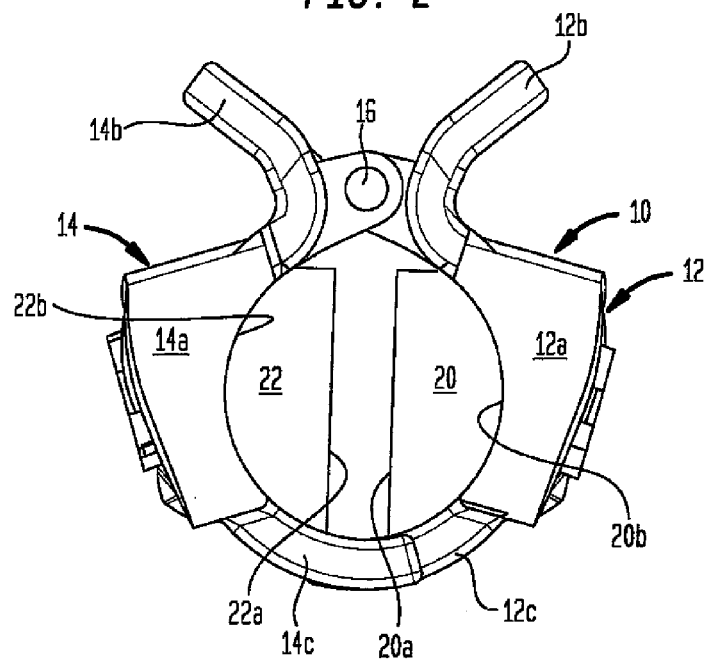
FIG. 2 is a plan view of the end of the device of FIG. 1.
Figure 3:
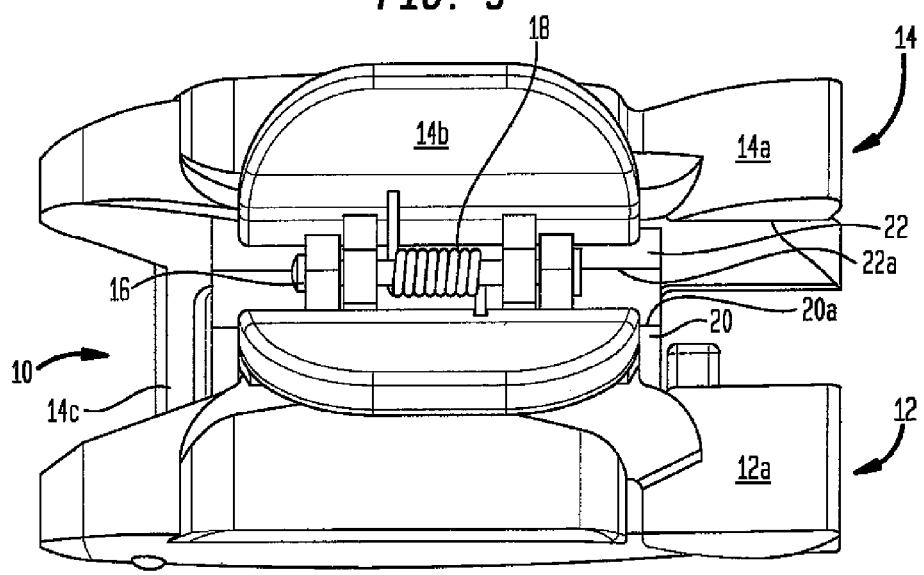
FIG. 3 is a plan view of the top of the device of FIG. 1.
Figure 6:
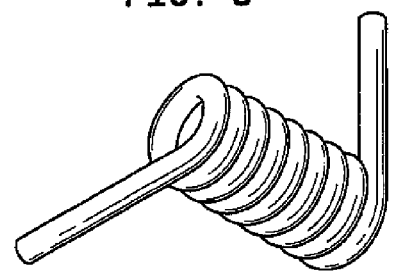
FIG. 6 is a perspective view of the spring of the device of FIG. 1.

A spring 18, best seen in FIG. 6, is provided to bias the jaw members toward the proximate position. As best seen in FIG. 2, spring 18 surrounds pivot member 16 and the ends of spring 18 bear against handle portions 12b, 14b, respectively.

Situated between clamping portions 12a, 14a are first and second generally semi-cylindrical resilient members 20, 22. Each of the resilient members 20, 22 has a generally planar interior surface 20a, 22a and a generally arcuate exterior surface 20b, 22b. As best seen in FIG. 2, arcuate surface 20b of resilient member 20 is attached by adhesive or other conventional means to the interior surface of clamping portion 12a of jaw member 12 and arcuate surface 22b of resilient member 22 is attached by adhesive or other conventional means to the interior surface of clamping portion 14a of jaw member 14.

As seen in FIG. 2, interior surfaces 20a, 22a of the resilient members are in face-to-face relation when the jaw members are in the proximate position. As illustrated, the interior surfaces 20a, 22a of the resilient members are generally parallel to each other but spaced apart by a small distance when the jaw members are in the proximate position, such that the fishing rod and fishing line can be received and retained therebetween. However, for some applications, it may be preferable to use somewhat wider resilient members such that the interior surfaces 20a and 20b are closer together or adjacent when the jaw members are in the proximate position.

Members 20, 22 may be formed of any resilient material such as foam, rubber, soft plastic or the like.

The handle portions 12b 14b of the jaw members extend away from each other when the jaw members are in the proximate position, as best seen in FIG. 2. When it is desired to move the clamping portions 12a, 14a away from each other to open the device to either attach the device to a fishing rod or remove the device from a fishing rod, the handle portions 12b, 14b are engaged between the fingers of the user and moved toward each other to separate fingers 12c, 14c. Releasing the handle portions allows spring 18 to move the jaw members 12, 14 back to the proximate position.

As seen in the drawings, the upper sections of the clamping portions 12a, 14a are fish-like in shape and appearance when viewed from the side. That is, they are shaped to simulate a fish, having a nose portion with an eye at one end and a bifurcated tail-like portion at the other end.

Figure 7:
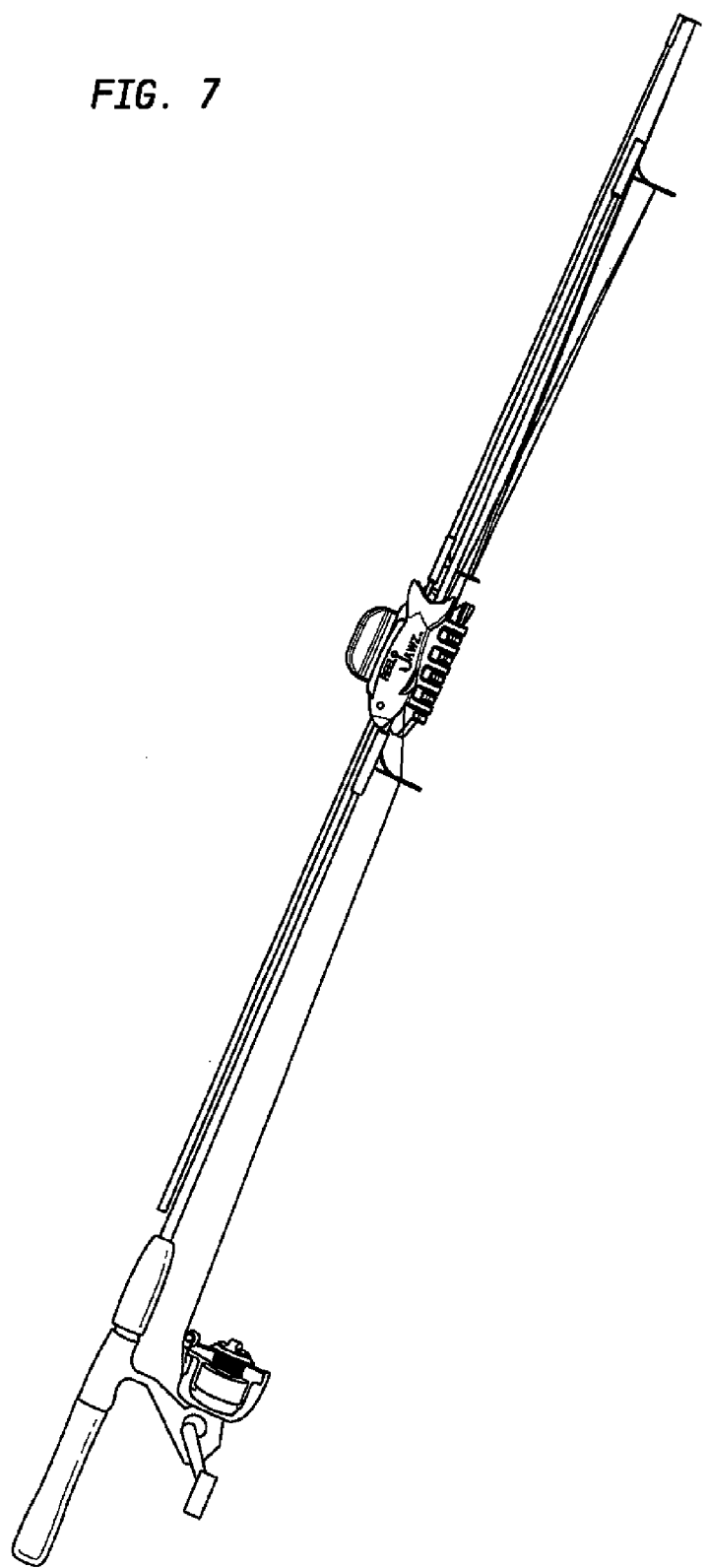
FIG. 7 is a side view of the device of FIG. 1 as it would appear mounted on a fishing rod to retain the fishing line.

Referring to FIG. 7, that figure shows device 10 mounted on a fishing rod 24 to clamp fishing line 26 to the rod. Further, that figure also illustrates that the device may be used to clamp a second rod 28, only partially shown, to rod 24 for safely transporting both rods. It will be understood that a plurality of rods with fishing line may be held together by device 10, if desired.

While only a single preferred embodiment of the present invention has been disclosed for purposes of illustration, it is obvious that many modifications and variations could be made thereto. It is intended to cover all of those modifications and variations which fall within the scope of the present invention, as defined by the following claims.

I claim:

1. In combination, a fishing rod and a fishing line and a device for retaining said fishing rod and said fishing line comprising: first and second jaw members, each of said jaw members comprising a clamping portion with an exterior side surface and a handle portion; each of said clamping portions comprising a resilient member having an interior surface; means for connecting said first and second jaw members for pivotal movement about an axis between a clamping position, wherein said interior surfaces of said resilient members are substantially parallel to each other but spaced apart a small distance such that said fishing rod and fishing line can be received and retained therebetween, and a second position, wherein said interior surfaces of said resilient members are spaced from each other; and means for biasing said jaw members toward said clamping position; wherein said exterior side surface of at least one of said clamping portions has a fish body with a nose portion at one end and a bifurcated tail-like portion at the other end, said fish body extending in a plane substantially parallel to said axis.

2. The combination of claim 1 wherein each of said resilient members has a generally semi-cylindrical shape.

3. The combination of claim 1 wherein said interior surfaces of said resilient members comprise substantially planar surfaces.

4. The combination of claim 1 wherein said clamping portion of one of said jaw members comprises a set of spaced fingers.

5. The combination of claim 1 wherein said clamping portion of each of said jaw members comprises a set of spaced fingers.

6. The combination of claim 1 wherein said clamping portion of each of said jaw members comprises a set of spaced fingers, the fingers of one of said sets being offset from the fingers from the other of said sets.

7. The combination of claim 1 wherein said handle portions extend away from each other when said jaw members are in said clamping position.

8. The combination of claim 1 wherein said exterior surface of said clamping portion comprises a dorsal fin shaped member extending along the direction of said axis.

9. The combination of claim 1 wherein said exterior surface of said clamping portion comprises a radially outwardly directed side fin shaped member.

* * * * *